(12) United States Patent
Arioka et al.

(10) Patent No.: US 10,281,340 B2
(45) Date of Patent: May 7, 2019

(54) TEMPERATURE MEASURING SYSTEM AND TEMPERATURE MEASURING METHOD

(71) Applicant: FUJITSU LIMITED, Kawasaki-shi, Kanagawa (JP)

(72) Inventors: Takahiro Arioka, Isehara (JP); Kazushi Uno, Atsugi (JP); Takeo Kasajima, Machida (JP); Fumio Takei, Isehara (JP); Hiroyuki Fukuda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 611 days.

(21) Appl. No.: 14/992,343

(22) Filed: Jan. 11, 2016

(65) Prior Publication Data

US 2016/0238461 A1    Aug. 18, 2016

(30) Foreign Application Priority Data

Feb. 12, 2015  (JP) .................................. 2015-025376

(51) Int. Cl.
    *G01K 11/32*    (2006.01)
(52) U.S. Cl.
    CPC .................................. *G01K 11/32* (2013.01)
(58) Field of Classification Search
    CPC .................................................... G01K 11/32
    USPC ........................................................... 374/1
    See application file for complete search history.

(56) References Cited

U.S. PATENT DOCUMENTS

| | | | |
|---|---|---|---|
| 5,825,804 A * | 10/1998 | Sai .......................... | G01K 11/32 374/137 |
| 2005/0094129 A1* | 5/2005 | MacDougall ......... | E21B 47/065 356/73.1 |
| 2011/0110621 A1* | 5/2011 | Duncan ................... | E21B 47/06 385/13 |
| 2012/0033709 A1* | 2/2012 | Kasajima ............... | G01K 11/32 374/161 |
| 2012/0307861 A1* | 12/2012 | Takei ....................... | G01K 3/06 374/102 |
| 2013/0100984 A1* | 4/2013 | Agawa ................... | G01K 11/32 374/161 |

FOREIGN PATENT DOCUMENTS

| | | |
|---|---|---|
| JP | 2005-091320 | 4/2005 |
| JP | 2006-257458 | 9/2006 |

* cited by examiner

*Primary Examiner* — Natalie Huls
*Assistant Examiner* — Janice M Soto
(74) *Attorney, Agent, or Firm* — Fujitsu Patent Center

(57) ABSTRACT

A temperature measuring system includes a laser light source to emit optical pulses, an optical fiber, arranged to pass through a plurality of measuring points, and input with the optical pulses, and a measuring device to detect backscattering light output from the optical fiber and measure a temperature at the plurality of measuring points, to acquire measured temperature data. The measuring device computes corrected temperature data by varying a degree of smoothing the measured temperature data in a distance direction of the optical fiber, according to a correlation between the measured temperature data and a transfer function peculiar to the temperature measuring system.

11 Claims, 9 Drawing Sheets

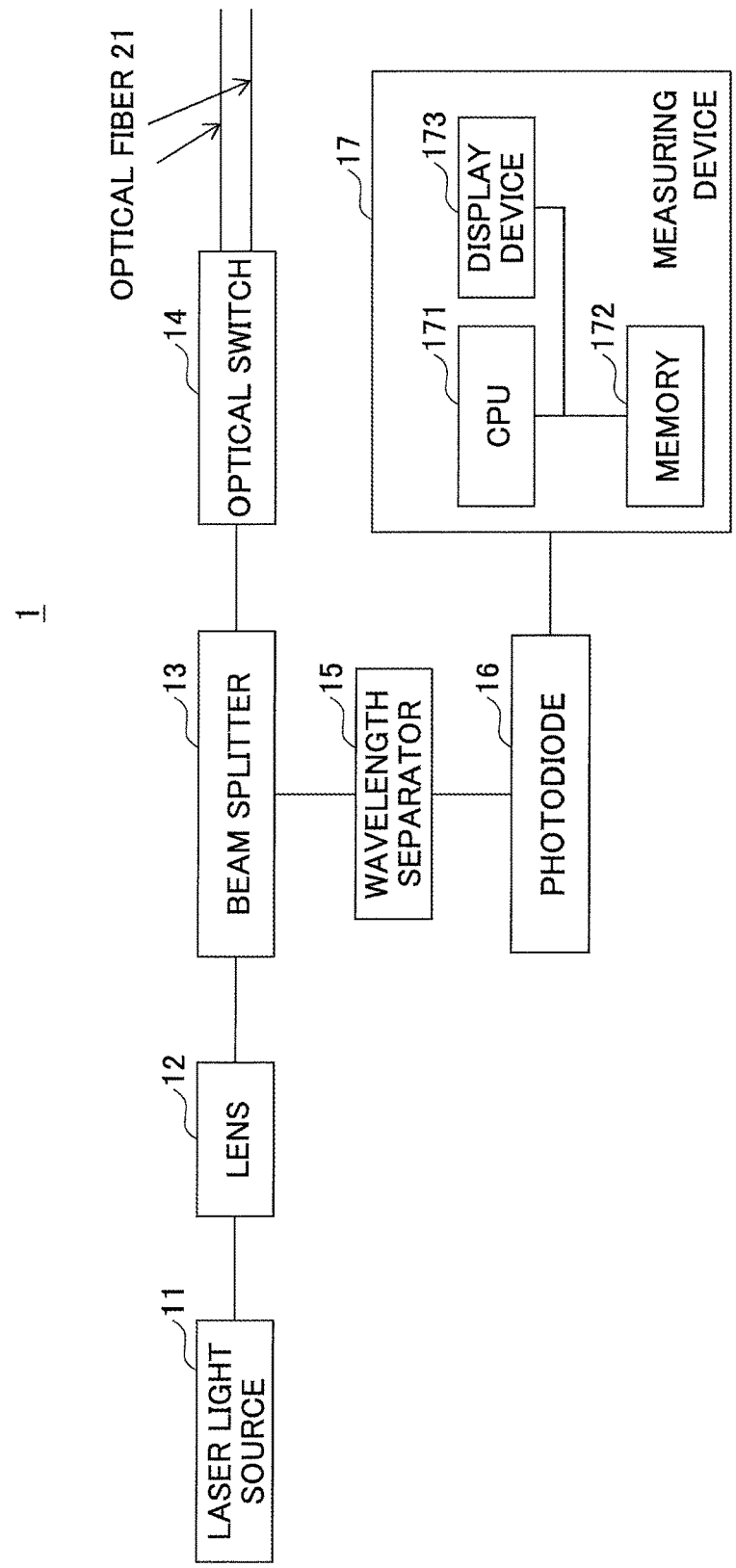

TEMPERATURE MEASURING SYSTEM AND TEMPERATURE MEASURING METHOD

CROSS-REFERENCE TO RELATED APPLICATIONS

This application is based upon and claims the benefit of priority of the prior Japanese Patent Application No. 2015-025376, filed on Feb. 12, 2015, the entire contents of which are incorporated herein by reference.

FIELD

The embodiments discussed herein are related to a temperature measuring system, a temperature measuring method, and a computer-readable recording medium having stored therein a program for causing a computer to execute a temperature measuring process.

BACKGROUND

In a computer room, an IDC (Internet Data Center), or the like, an amount of heat generated from an electronic apparatus, such as a server, is increasing due to increasing integration density of the electronic apparatus. For this reason, it is desirable to appropriately cool the electronic apparatus.

Methods of cooling the electronic apparatus include a method that controls an indoor air flow to prevent excessive generation of heat accumulation, a method that cools the room by air conditioning, or the like, for example. In order to stably control the cooling state inside the room according to such cooling methods, it is desirable to measure the room temperature at a plurality of measuring points. When a three-dimensional temperature distribution inside the room can be obtained, this temperature distribution may be used to control the air conditioning or the like, so that it is possible to stably control the cooling state inside the room.

An example of the method that measures the temperature distribution includes a method that uses an optical fiber as a temperature sensor. Generally, in the case of the temperature measuring method that uses the optical fiber, measuring the temperature distribution with a high accuracy in a relatively narrow range, such as the server within the data center, is more difficult compared to measuring the temperature distribution with the high accuracy in a relatively wide range.

In a multipoint temperature measuring system using the optical fiber, optical pulses having a predetermined wavelength propagate through the optical fiber, and the temperature distribution along a propagating direction of the optical pulses is obtained from a variation with time of back-scattering light (that is, Raman scattering light) caused by the propagating optical pulses. In the temperature measuring method using the optical fiber, a distance resolution depends on an optical pulse width. In addition, an SNR (Signal-to-Noise Ratio) is determined based on a pulse area, and an elapsed time of temperature data at each measuring point for computing the temperature distribution from the variation with time of the back-scattering light. For this reason, in order to obtain a high distance resolution and a high SNR, a peak value of the optical pulses is desirably high. However, when optical pulses having a high laser power exceeding a threshold value (that is, a Raman threshold value) are input to the optical fiber that is a nonlinear medium, the so-called SRS (Stimulated Raman Scattering) occurs. Hence, the laser power is desirably suppressed to the threshold value or lower.

A laser light source is an example of a light source that emits the optical pulses. Generally, one of two kinds, namely, a solid state laser and a semiconductor laser, is used for the laser light source. The solid state laser is suited for high-precision measurement because of the wavelength accuracy and the peak value of the optical pulses are both high and noise is uneasily generated, however, the solid state laser is relatively expensive. On the other hand, the semiconductor laser is inexpensive compared to the solid state laser, however, the wavelength accuracy and the peak value of the optical pulses are both low and noise is easily generated. In addition, the SNR tends to deteriorate in the case of the semiconductor laser, because wavelength dispersion increases particularly at a far end. Accordingly, it is desirable to reduce the noise in the case in which the inexpensive semiconductor laser is used for the laser light source. There is a known method that improves the SNR by applying the Golay code, so as to use multipulses instead of a single pulse for the optical pulses. However, even when the multipulses are used for the optical pulses, there are cases in which the temperature accuracy required by big data analysis or the like, for example, cannot be satisfied.

In order to further improve the SNR, there are methods that use a filter, such as a highpass filter, a lowpass filter, a bandpass filter, or the like, to attenuate frequency bands other than a frequency band of temperature data and reduce the noise. However, when the frequency band to be filtered is set so as to positively reduce the noise, a temperature data component is also attenuated by the filtering. On the other hand, when the frequency band to be filtered is set so as not to attenuate the temperature data component, it is difficult to positively reduce the noise by the filtering. In addition, in the case of the multipoint temperature measuring system, it is difficult to predict the kind of temperature distribution that will be measured, and it is difficult to create a statistical model or a physical model and reduce the noise by applying a Kalman filter or the like.

Therefore, in the multipoint temperature measuring system using the optical fiber, it is difficult to distinguish the temperature data and the noise, and for this reason, it is difficult to reduce the noise.

Examples of related art may include Japanese Laid-Open Patent Publication No. 2005-091320 and No. 2006-257458, for example.

SUMMARY

Accordingly, it is an object in one aspect of the embodiments to provide a temperature measuring system, a temperature measuring method, and a computer-readable recording medium, which can reduce noise in a temperature measurement using an optical fiber.

According to one aspect of the embodiments, a temperature measuring system includes a laser light source configured to smit optical pulses; an optical fiber, arranged to pass through a plurality of measuring points, and input with the optical pulses; and a measuring device configured to detect back-scattering light output from the optical fiber and measure a temperature at the plurality of measuring points, to acquire measured temperature data, wherein the measuring device computes corrected temperature data by varying a degree of smoothing the measured temperature data in a distance direction of the optical fiber, according to a correlation between the measured temperature data and a transfer function peculiar to the temperature measuring system.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a block diagram illustrating an example of a temperature measuring system in one embodiment;

DESCRIPTION OF EMBODIMENTS

Figure 2A:
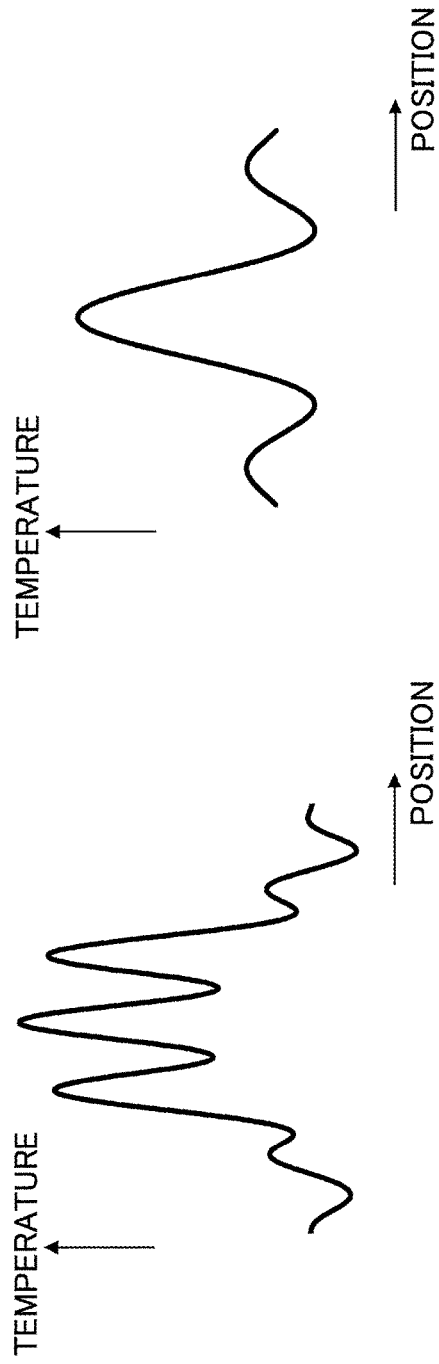
FIGS. 2A and 2B are diagrams for explaining an example of a correlation.

A temperature measuring system disclosed herein may input optical pulses emitted from a laser light source to an optical fiber that is arranged to pass through a plurality of measuring points, and detect back-scattering light output from the optical fiber and measures a temperature at the plurality of measuring points by a measuring device to acquire measured temperature data. The disclosed temperature measuring system may compute, by the measuring device, corrected temperature data by varying a degree of smoothing the measured temperature data in a distance direction of the optical fiber, according to a correlation between the measured temperature data and a transfer function peculiar to the temperature measuring system.

Preferred embodiments of the present invention will be described with reference to the accompanying drawings.

A description will now be given of a temperature measuring system, a temperature measuring method, and a computer-readable recording medium in each embodiment according to the present invention.

FIG. 1 is a block diagram illustrating an example of a temperature measuring system in one embodiment. A temperature measuring system 1 illustrated in FIG. 1 includes a laser light source 11, a lens 12, a beam splitter 13, an optical switch 14, a wavelength separator 15, a photodiode 16, and a measuring device 17. The optical switch 14 is connected to an optical fiber 21. The optical fiber 21 is arranged to pass through a plurality of measuring points (that is, a plurality of locations where the temperature is to be measured) of a measuring target, such as a server or the like within a data center. The optical fiber 21 forms a loop shape, and both ends of the loop shape connect to the optical switch 14. The measuring target is of course not limited to the server or the like within the data center. In FIG. 1, a route between the photodiode 16 and the measuring device 17 is an electrical route (or path), however, other routes are optical routes (or paths).

The laser light source 11 may be formed by a solid state laser, a semiconductor laser, or the like, for example. Optical pulses emitted from the laser light source 11 are supplied to the optical switch 14, that is an example of a switching device (or switching means), via the lens 12 and the beam splitter 13. The beam splitter 13 is an example of a light separator (or light separating means). The optical switch 14 alternately switches both ends of the optical fiber 21 at predetermined intervals, for example, by a known method, in order to alternately repeat a first mode and a second mode. In the first mode, back-scattering light of the optical pulses emitted from one end of the optical fiber 21 is received at the other end of the optical fiber 21. In the second mode, the back-scattering light emitted from the other end of the optical fiber 21 is received at the one end of the optical fiber 21.

The back-scattering light received by the optical switch 14 is deflected by the beam splitter 13 towards the wavelength separator 15. The wavelength separator 15 separates, from the back-scattering light, a wavelength component, such as Raman scattering light, Brillouin scattering light, or the like, that is used for the measurement, according to a known method. The wavelength component that is separated from the back-scattering light by the wavelength separator 15 may be set according to the temperature to be detected. The wavelength separator 15 may be formed by a combination of a beam splitter, an optical filter, a condenser lens, or the like. The photodiode 16 is an example of a photodetector. The photodiode 16 detects the wavelength component used for the measurement, separated by the wavelength separator 15, and outputs the detected wavelength component to the measuring device 17. The wavelength component used for the measurement may include the Raman scattering light, the Brillouin scattering light, Rayleigh scattering light, or the like.

The pulse width of the back-scattering light input to the photodiode 16 depends on a length of the optical fiber 21. Hence, an interval of the optical pulses emitted from the laser light source 11 is set so that an overlap of the back-scattering light of each of the optical pulses does not occur.

The measuring device 17 includes a CPU (Central Processing Unit) 171, a memory 172, and a display device 173. The CPU 171 is an example of a processor. The memory 172 is an example of a storage (or storage means) that stores data, and programs to be executed by the CPU 171. The display device 173 is an example of an output device (or output means) that outputs a measured result or the like. The CPU 171 can execute the program stored in the memory 172, and perform a temperature measuring process to acquire measured temperature data. The temperature measuring process detects the back-scattering light output from the optical fiber 21, based on the detected wavelength component from the photodiode 16, and acquires the measured temperature data by computing the temperature at a plurality of measuring points. The memory 172 may be formed by a non-transitory computer-readable recording medium having stored therein the program for causing a computer, such as the CPU 171, to execute the temperature measuring process. The non-transitory computer-readable recording medium may include a semiconductor memory device, various kinds of recording media, or the like. Measured temperature data output from the CPU 171 are displayed on the display device 173, for example. The measured temperature data displayed on the display device 173 may include a temperature distribution of the measuring target, the temperature at each of the measuring points, a warning according to the temperature, or the like.

In addition, the measuring device 17 computes corrected temperature data that is corrected by varying a degree of smoothing (that is, weighting) of the measured temperature data in a distance direction of the optical fiber 21, according to a correlation between the measured temperature data that is acquired and the transfer function peculiar to the temperature measuring system 1. In other words, when the temperature measuring system 1 is assumed to be a linear system, the temperature distribution that is measured is a convolution of the actual temperature distribution and the transfer function, and noise is included in the measured temperature distribution. For this reason, there is a correlation between the measured temperature distribution and the transfer function, and it is possible to distinguish between a temperature change and the noise, according to the correlation.

Next, a description will be given of a correction of the measured temperature data according to a correlation between a difference between the measured temperature data and a moving average of the measured temperature data, and the transfer function. In a case in which a correlation coefficient representing the correlation is less than or equal to a threshold value, the noise is judged from this correlation coefficient, and the degree of smoothing of the measured temperature data in the distance direction of the optical fiber 21 is varied to compute the corrected temperature data. The correlation coefficient may be obtained by a FIR (Finite Impulse Response) filer that detects a correlation strength of the measured temperature data with respect to the transfer function.

Figure 2B:
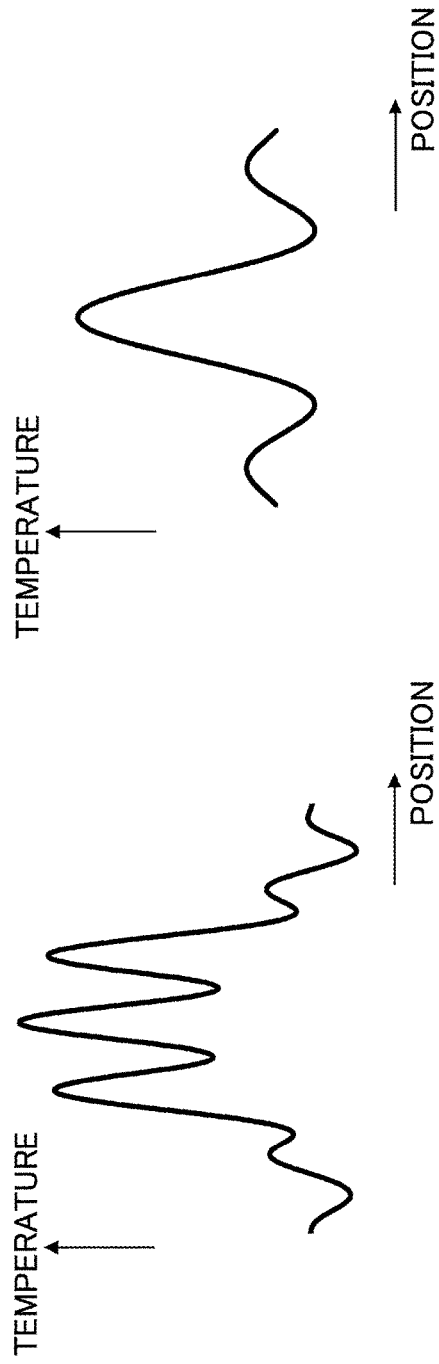

FIGS. 2A and 2B are diagrams for explaining an example of the correlation. FIG. 2A illustrates the measured temperature distribution along the distance direction of the optical fiber 21, and FIG. 2B illustrates the transfer function peculiar to the temperature measuring system 1. In FIGS. 2A and 2B, the ordinate indicates the temperature in arbitrary units, and the abscissa indicates the position in arbitrary units. A correlation coefficient p(x) of the correlation of measured temperature data y(x) with respect to the transfer function at a position x corresponding to the distance from one end of the optical fiber 21 to which the optical pulses are input, may be represented by the following formula based on the measured temperature data y(x) at the position x.

$$p(x) = \frac{\sum_{k=x-n/2}^{n}(y(k)-\overline{y(k)})\left(h\left(k-x+\frac{n}{2}\right)-\overline{h}\right)}{\sqrt{\left\{\sum_{k=x-n/2}^{n}(y(k)-\overline{y(k)})^2\right\}\left\{\sum_{k=x-n/2}^{n}\left(h\left(k-x+\frac{n}{2}\right)-\overline{h}\right)^2\right\}}}$$

In the formula above,
$\overline{y(x)}$
denotes an arithmetic mean of the measured temperature data y(x) at the position x, h(x') denotes the transfer function, and
$\overline{h}$
denotes an arithmetic mean of the transfer function h(x').

Figure 3:
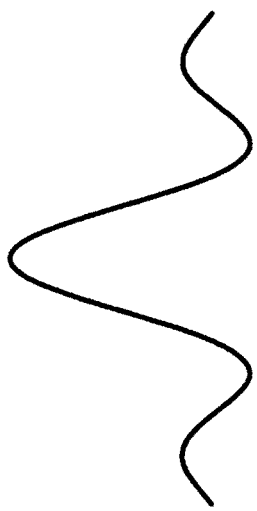
FIG. 3 is a diagram illustrating an example of a transfer function.
Figure 4:
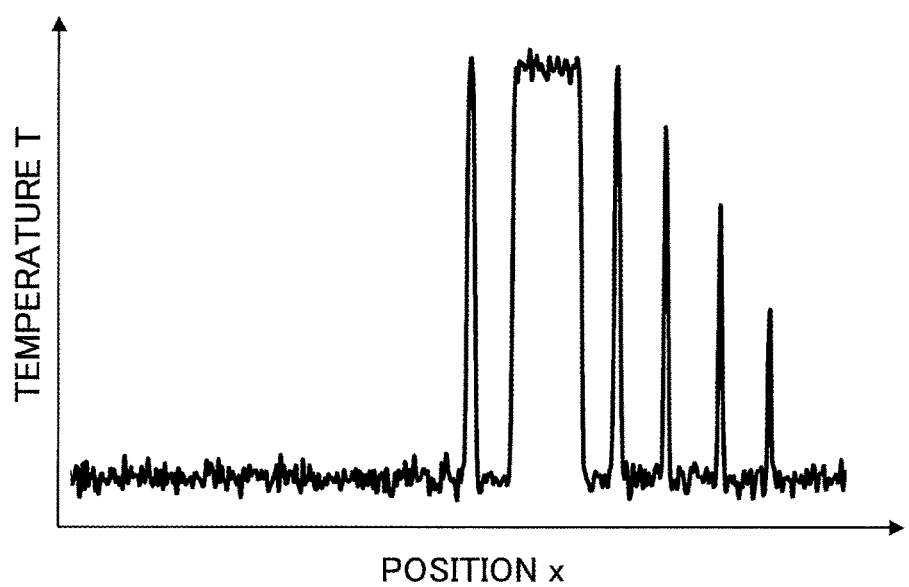
FIG. 4 is a diagram illustrating an example of measured temperature data.

FIG. 3 is a diagram illustrating an example of the transfer function. In FIG. 3, the ordinate indicates the temperature in arbitrary units, and the abscissa indicates the position, corresponding to the distance from one end of the optical fiber 21 to which the optical pulses are input, in arbitrary units. In addition, FIG. 4 is a diagram illustrating an example of the measured temperature data. In FIG. 4, the ordinate indicates a temperature T in arbitrary units, and the abscissa indicates the position x, corresponding to the distance from one end of the optical fiber 21 to which the optical pulses are input, in arbitrary units.

In a case in which an absolute value of the correlation coefficient p(x) is greater than a threshold value P1 such that |P(x)|>0.7, for example, it is judged that the measured temperature data y(x) represents the temperature change, and the measured temperature data y(x) is utilized as it is (weighted by 1) as the corrected temperature data, for example. On the other hand, in a case in which |P(x)|<=0.7, it is judged that the measured temperature data y(x) represents the noise, and data obtained by weighting (weighted by other than 1) the measured temperature data y(x) is utilized as the corrected temperature data. In other words, a first weighting that is performed in the case in which the the measured temperature data y(x) is judged as representing the temperature change, and a second weighting that is performed in the case in which the the measured temperature data y(x) is judged as representing the noise, are mutually different. The first weighting may compute the measured temperature data y(x) as it is (weighted by 1) as the corrected temperature data.

Figure 5:
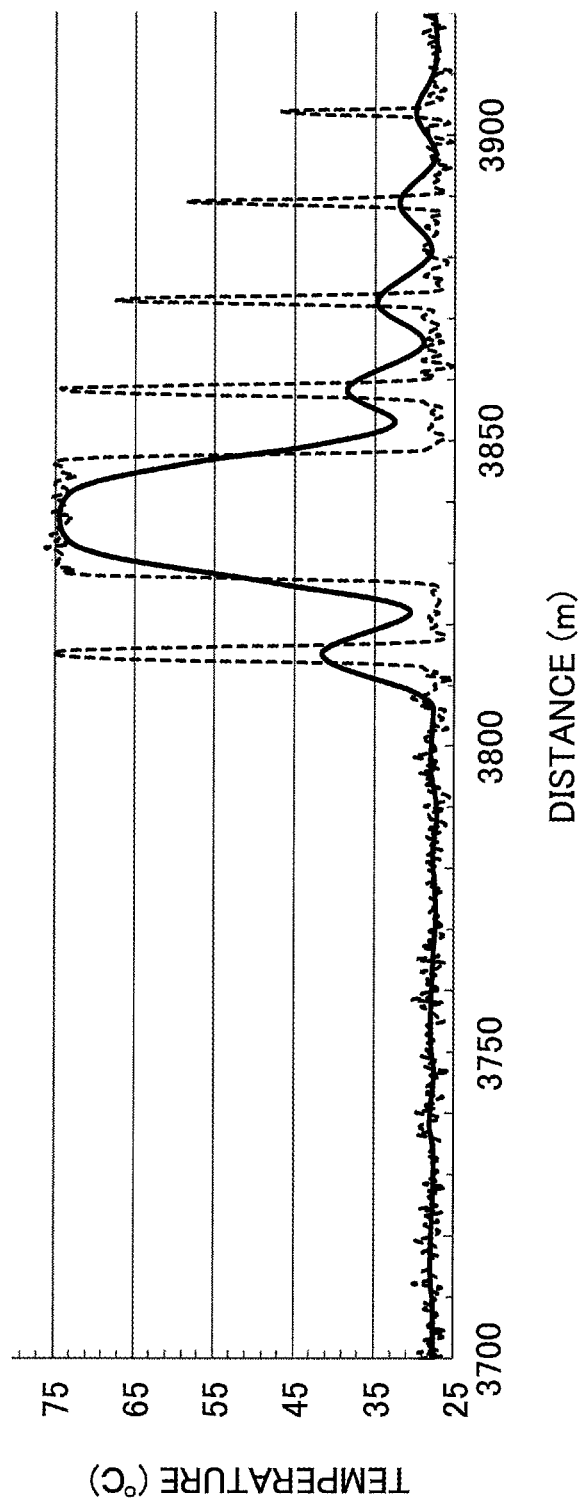
FIG. 5 is a diagram illustrating a comparison example of the measured temperature data corrected by a lowpass filter.

FIG. 5 is a diagram illustrating a comparison example of the measured temperature data corrected by a lowpass filter. In FIG. 5, the ordinate indicates the temperature, and the abscissa indicates the position corresponding to the distance from one end of the optical fiber 21 to which the optical pulses are input. In a case in which the measured temperature data illustrated in FIG. 4 is filtered by the lowpass filter, filtered measured temperature data becomes as indicated by a solid line, with respect to the measured temperature data indicated by a dotted line, and a high-frequency component of the temperature data to be originally detected is lost by the noise reduction.

Figure 6:
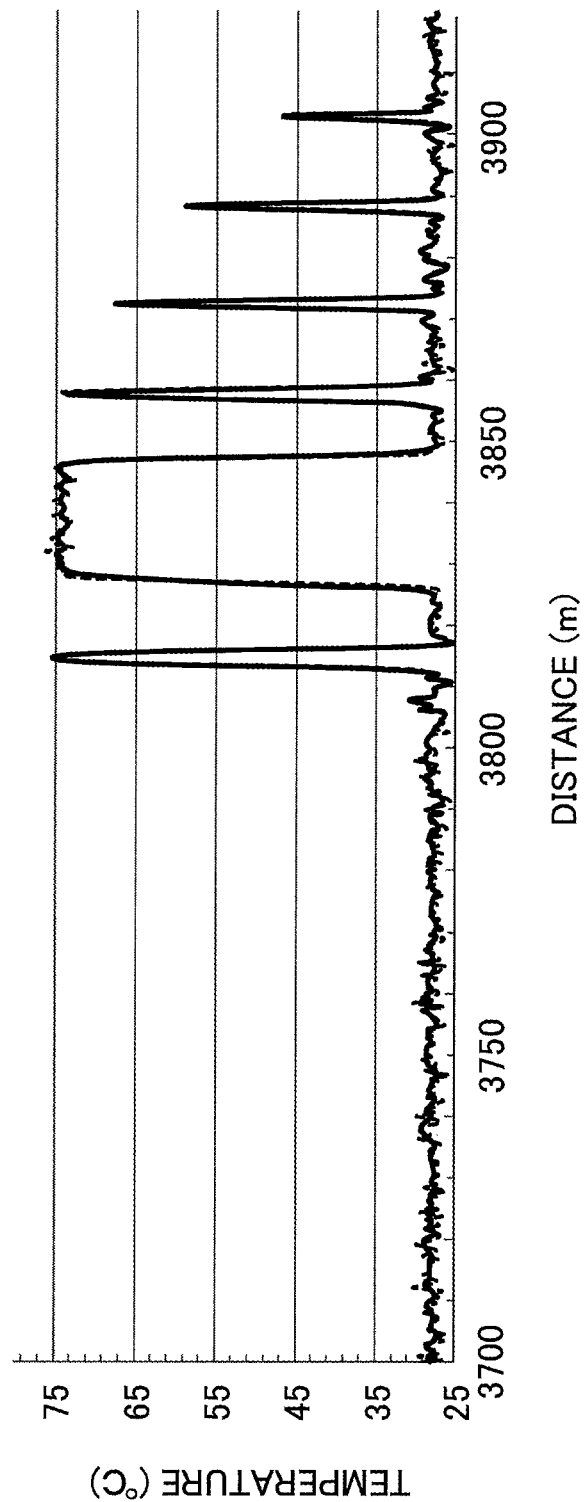
FIG. 6 is a diagram illustrating an example of the measured temperature data corrected according to one embodiment.

On the other hand, in this embodiment, when the correlation coefficient p(x) representing the correlation is less than or equal to the threshold value P1 (for example, P1=0.7), the corrected temperature data is computed by varying the degree of smoothing of the measured temperature data in the distance direction of the optical fiber 21. Hence, the corrected temperature data become as as illustrated in FIG. 6. FIG. 6 is a diagram illustrating an example of the measured temperature data corrected according to one embodiment. In FIG. 6, the ordinate indicates the temperature, and the abscissa indicates the position corresponding to the distance from one end of the optical fiber 21 to which the optical pulses are input. In a case in which measured temperature data illustrated in FIG. 4 is corrected according to this embodiment, the corrected temperature data becomes as indicated by a solid line, with respect to the measured temperature data indicated by a dotted line, and it can be confirmed that the high-frequency component of the temperature data to be originally detected is not lost by the noise reduction.

Figure 7:
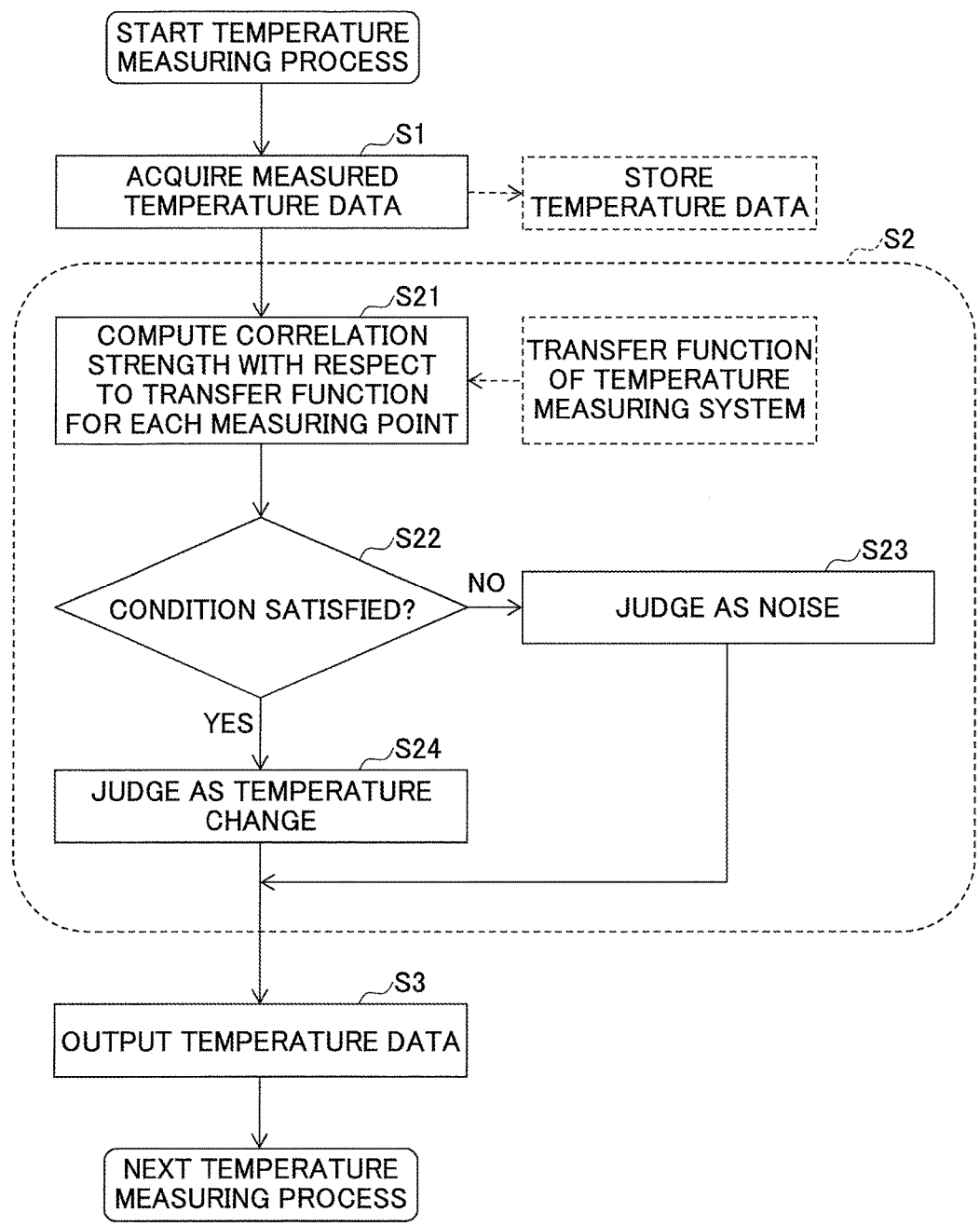
FIG. 7 is a flow chart for explaining an example of a temperature measuring process in one embodiment.

FIG. 7 is a flow chart for explaining an example of a temperature measuring process in one embodiment. The temperature measuring process illustrated in FIG. 7 can be executed the CPU 171 of the measuring device 17 illustrated in FIG. 1. When the temperature measuring process using the optical fiber 21 is started in FIG. 7, the CPU 171, in step S1, acquires the temperature data (that is, measured temperature data) measured at measuring points (or measuring positions), based on the detected wavelength component from the photodiode 16, and stores the measured temperature data in the memory 172. After step S1, the process advances to a correction process of step S2.

The correction process of step S2 includes processes of steps S21 through S24 described hereunder. In step S21, the CPU 171 computes the correlation strength of the measured temperature data with respect to the transfer function, for each of the measuring points, and stores the computed correlation strength in the memory 172. In step S22, the CPU 171 judges whether the correlation coefficient p(x) satisfies a condition. The condition may be a first condition that is |p(x)|>0.7, or Tx=>T', where Tx denotes the temperature at the measuring point (or measuring position) x, for example. Alternatively, the condition may be a second condition that an absolute value of a product of the temperature Tx at the measuring point x and the correlation coefficient p(x) is greater than or equal to a threshold value P2, that is, |Tx·p(x)|>=P2, for example.

When the judgment result in step S22 is NO, the CPU 171, in step S23, judges that a difference temperature data between the measured temperature data currently acquired and the measured temperature data previously acquired is the noise. In step S23, the CPU 171 computes the corrected temperature data by weighting that varies the degree of smoothing of the measured temperature data in the distance direction of the optical fiber 21. The weighting itself performed in step S23 is not limited to a particular weighting. On the other hand, when the judgment result in step S22 is YES, the CPU 171, in step S24, judges that the difference temperature data between the measured temperature data currently acquired and the measured temperature data previously acquired is the temperature change. In step S24, the CPU 171 computes the corrected temperature data by using the measured temperature data as it is (weighted by 1) as the corrected temperature data.

After step S23 or S24, the process advances to step S3. In step S3, the CPU 171 outputs the corrected temperature data computed in step S23 or S24, and the process advances to a next temperature measuring process using the optical fiber 21. The CPU 171 can thus compute the temperature distribution based on the corrected temperature data obtained by correcting the measured temperature data in the manner described above. The CPU 171 may compute the corrected temperature distribution by performing a process, such as a known weighted average process (or weighted moving average) with respect to the corrected temperature data, by taking into consideration an attenuation of light, for example. The temperature measuring process illustrated in FIG. 7 may be ended according to an ending condition.

Figure 8:
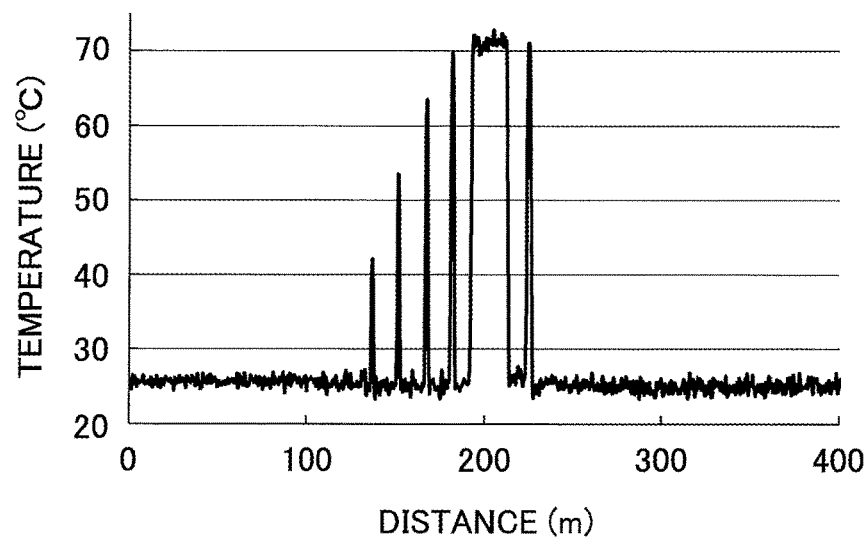
FIG. 8 is a diagram illustrating an example of the measured temperature data.

FIG. 8 is a diagram illustrating an example of the measured temperature data acquired by step S1 of the temperature measuring process illustrated in FIG. 7. In FIG. 8 and FIGS. 9 through 13 which will be described later, the ordinate indicates the temperature, and the abscissa indicates the distance from one end of the optical fiber 21 to which the optical pulses are input.

Figure 9:
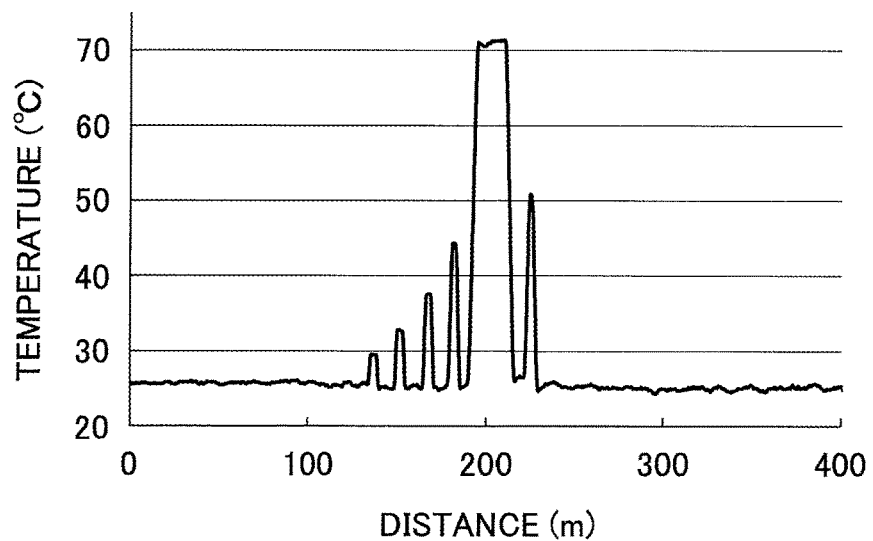
FIG. 9 is a diagram illustrating a comparison example of the measured temperature data obtained by correcting the measured temperature data illustrated in FIG. 8 by the lowpass filter.
Figure 10:
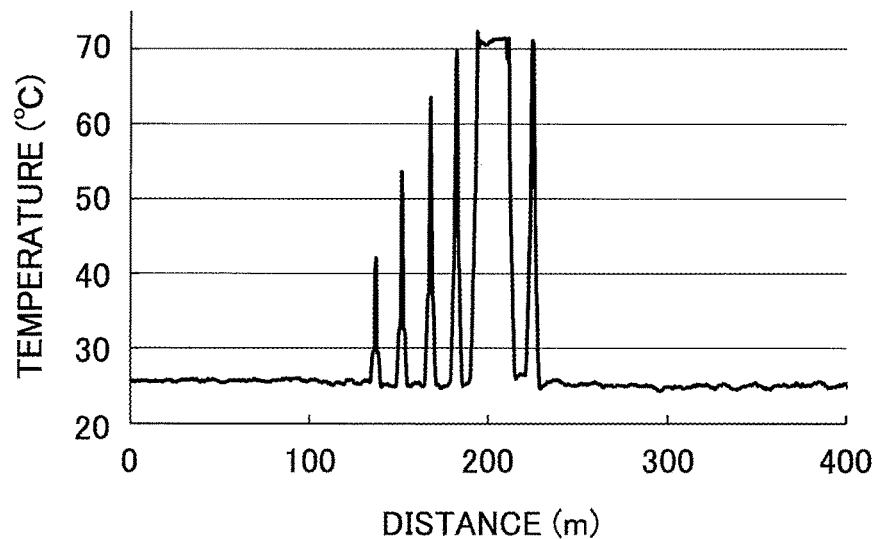
FIG. 10 is a diagram illustrating an example of the measured temperature data obtained by correcting the measured temperature data illustrated in FIG. 8 by the temperature measuring process in one embodiment.

FIG. 9 is a diagram illustrating a comparison example of the measured temperature data obtained by correcting the measured temperature data illustrated in FIG. 8 by the lowpass filter. In addition, FIG. 10 is a diagram illustrating an example of the measured temperature data obtained by correcting the measured temperature data illustrated in FIG. 8 by the temperature measuring process in one embodiment, that is, by step S2 of the temperature measuring process illustrated in FIG. 7. As may be seen by comparing FIGS. 9 and 10, according to this embodiment, the high-frequency component of the temperature data to be originally detected is not lost by the noise reduction, as illustrated in FIG. 10, unlike the case of the comparison example illustrated in FIG. 9, even at the position x that is relatively distant from the temperature measuring system 1. In other words, this embodiment can reduce the noise without losing the high-frequency component of the temperature data to be originally detected, as illustrated in FIG. 10.

Figure 11:
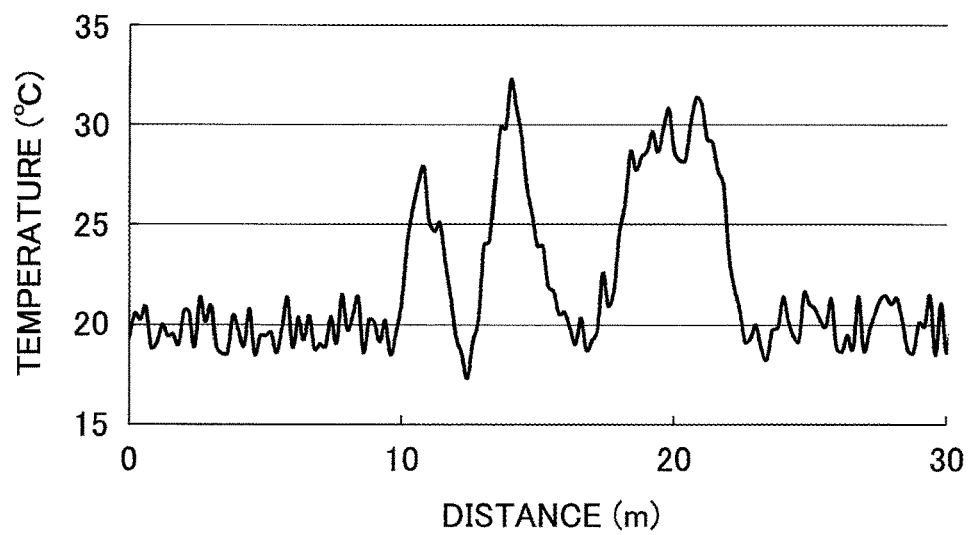
FIG. 11 is a diagram illustrating another example of the measured temperature data.

FIG. 11 is a diagram illustrating another example of the measured temperature data acquired by step S1 of the temperature measuring process illustrated in FIG. 7.

Figure 12:
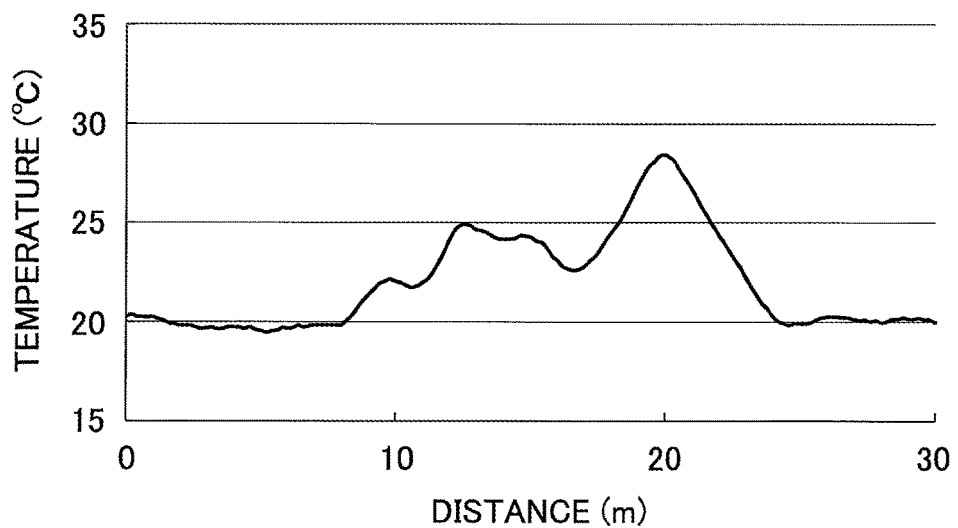
FIG. 12 is a diagram illustrating a comparison example of the measured temperature data obtained by correcting the measured temperature data illustrated in FIG. 11 by the lowpass filter.
Figure 13:
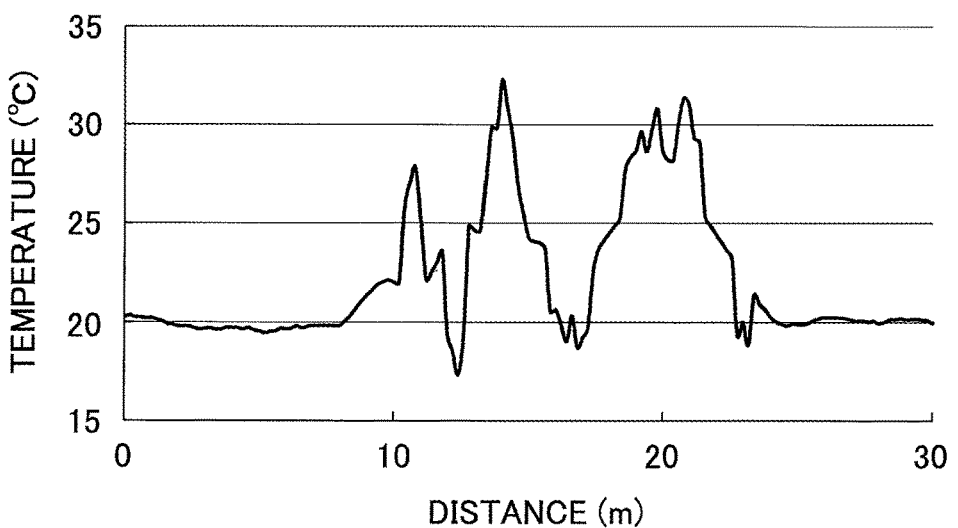
FIG. 13 is a diagram illustrating an example of the measured temperature data obtained by correcting the measured temperature data illustrated in FIG. 11 by the temperature measuring process in one embodiment.

FIG. 12 is a diagram illustrating a comparison example of the measured temperature data obtained by correcting the measured temperature data illustrated in FIG. 11 by the lowpass filter. In addition, FIG. 13 is a diagram illustrating an example of the measured temperature data obtained by correcting the measured temperature data illustrated in FIG. 11 by the temperature measuring process in one embodiment, that is, by step S2 of the temperature measuring process illustrated in FIG. 7. As may be seen by comparing FIGS. 12 and 13, according to this embodiment, the high-frequency component of the temperature data to be originally detected is not lost by the noise reduction, as illustrated in FIG. 13, unlike the case of the comparison example illustrated in FIG. 12, even at the position x that is relatively distant from the temperature measuring system 1. In other words, this embodiment can reduce the noise without losing the high-frequency component of the temperature data to be originally detected, as illustrated in FIG. 13.

According to each of the embodiments described above, it is possible to reduce noise in a temperature measurement using an optical fiber. According to each of the embodiments described above, it is possible to distinguish the temperature change and the noise when measuring the temperature using the optical fiber. For this reason, it is possible to easily reduce the noise that is distinguishable from the temperature change. In addition, it is possible to reduce the measuring time required to measure the temperature distribution, and to improve the measuring accuracy. Moreover, because the noise can be reduced, it is possible to use for the laser light source the semiconductor laser which has a poorer temperature characteristic compared to that of the solid state laser but is inexpensive compared to the solid state laser. In this case, it is possible to provide a temperature measuring system at a relatively low cost.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A temperature measuring system comprising:
    a laser light source configured to emit optical pulses;
    an optical fiber having a first end and a second end opposite to the first end, and arranged to pass through a plurality of temperature measuring points between the first end and the second end;
    an optical switch configured to alternately switch between a first mode and a second mode at predetermined intervals, wherein the optical switch inputs the optical pulses from the laser light source to the first end of the optical fiber and outputs the optical pulses from the second end of the optical fiber in the first mode, and inputs the optical pulses from the laser light source to the second end of the optical fiber and outputs the optical pulses from the first end of the optical fiber in the second mode;
    a separator configured to separate a wavelength component from back-scattering light of the optical pulses output from the optical switch;
    a detector configured to detect the wavelength component separated by the separator; and
    a measuring device configured to perform a measuring process, and including
    a memory configured to store a program;
    a processor configured to execute the program; and
    a display device configured to display a result of the measuring process,
    wherein the processor performs the measuring process including
        measuring a temperature at the plurality of measuring points based on the wavelength component detected by the detector,
        correcting the measured temperature data by varying a degree of smoothing the measured temperature data in a distance direction of the optical fiber, according to a correlation between a difference between the measured temperature data and a moving average of the measured temperature data, and a transfer function peculiar to the temperature measuring system, and
        displaying the result of the measuring process, including the corrected temperature data, on the display device,
    wherein the correcting includes a first weighting on the measured temperature data when one of a first condition that a correlation coefficient representing the correlation is greater than a first threshold value and a second condition that an absolute value of a product of the temperature at each of the plurality of measuring points and the correlation coefficient representing the correlation is greater than or equal to a second threshold value is satisfied, and a second weighting, different from the first weighting, on the measured temperature data when the one of the first condition and the second condition is not satisfied, to vary the degree of smoothness of the measured temperature data in the distance direction of the optical fiber.

2. The temperature measuring system as claimed in claim 1, wherein the first weighting computes the corrected temperature data by performing a weighting by 1 on the measured temperature data.

3. The temperature measuring system as claimed in claim 1, wherein the laser light source is one of a solid state laser and a semiconductor laser.

4. The temperature measuring system as claimed in claim 1, wherein the displaying the result of the measuring process further displays, on the display device, at least one of the temperature distribution of a measuring target that includes the plurality of measuring points, the temperature at each of the plurality of measuring points, and a warning according to the corrected temperature data, on the display device.

5. A temperature measuring method comprising:
    inputting optical pulses emitted from a laser light source of a temperature measuring system to an optical fiber that has a first end and a second end opposite to the first end and is arranged to pass through a plurality of measuring points;
    alternately switching an optical switch at predetermined intervals between a first mode in which the optical switch inputs the optical pulses from the laser light source to the first end of the optical fiber and outputs the optical pulses from the second end of the optical fiber, and a second mode in which the optical switch inputs the optical pulses from the laser light source to the second end of the optical fiber and outputs the optical pulses from the first end of the optical fiber;
    separating, by a separator, a wavelength component from back-scattering light of the optical pulses output from the optical switch;
    detecting, by a detector, the wavelength component separated by the separator; and
    performing, by a processor, a measuring process including
        measuring a temperature at the plurality of measuring points based on the wavelength component detected by the detecting, to acquire measured temperature data,
        correcting the measured temperature data by varying a degree of smoothing the measured temperature data in a distance direction of the optical fiber, according to a correlation between a difference between the measured temperature data and a moving average of the measured temperature data, and a transfer function peculiar to the temperature measuring system, and
        displaying, on a display device, the result of the measuring process, including the corrected temperature data,
    wherein the correcting includes a first weighting on the measured temperature data when one of a first condition that a correlation coefficient representing the correlation is greater than a first threshold value and a second condition that an absolute value of a product of the temperature at each of the plurality of measuring points and the correlation coefficient representing the correlation is greater than or equal to a second threshold value is satisfied, and a second weighting, different from the first weighting, on the measured temperature data when the one of the first condition and the second condition is not satisfied, to vary the degree of smoothness of the measured temperature data in the distance direction of the optical fiber.

6. The temperature measuring method as claimed in claim 5, wherein the first weighting computes the corrected temperature data by performing a weighting by 1 on the measured temperature data.

7. The temperature measuring method as claimed in claim 5, wherein the laser light source is one of a solid state laser and a semiconductor laser.

8. The temperature measuring method as claimed in claim 5, wherein the displaying the result of the measuring process further displays, on the display device, at least one of the temperature distribution of a measuring target that includes the plurality of measuring points, the temperature at each of the plurality of measuring points, and a warning according to the corrected temperature data, on the display device.

9. A non-transitory computer-readable recording medium having stored therein a program for causing a computer of a temperature measuring system to execute a temperature measuring process comprising:

measuring a temperature at a plurality of measuring points based on a wavelength component, that is separated by a separator from back-scattering light of optical pulses output from an optical switch and detected by a detector, to acquire measured temperature data, wherein the optical switch alternately switches at predetermined intervals between a first mode in which the optical switch inputs optical pulses from a laser light source to a first end of an optical fiber that is arranged to pass through the plurality of measuring points and outputs the optical pulses from a second end of the optical fiber opposite to the first end, and a second mode in which the optical switch inputs the optical pulses from the laser light source to the second end of the optical fiber and outputs the optical pulses from the first end of the optical fiber, correcting the measured temperature data by varying a degree of smoothing the measured temperature data in a distance direction of the optical fiber, according to a correlation between a difference between the measured temperature data and a moving average of the measured temperature data, and a transfer function peculiar to the temperature measuring system, and displaying, on a display device, a result of the temperature measuring process including the corrected temperature data, wherein the correcting includes a first weighting on the measured temperature data when one of a first condition that a correlation coefficient representing the correlation is greater than a first threshold value and a second condition that an absolute value of a product of the temperature at each of the plurality of measuring points and the correlation coefficient representing the correlation is greater than or equal to a second threshold value is satisfied, and a second weighting, different from the first weighting, on the measured temperature data when the one of the first condition and the second condition is not satisfied, to vary the degree of smoothness of the measured temperature data in the distance direction of the optical fiber.

10. The non-transitory computer-readable recording medium as claimed in claim 9, wherein the first weighting computes the corrected temperature data by performing a weighting by 1 on the measured temperature data.

11. The non-transitory computer-readable storage medium as claimed in claim 9, wherein the displaying the result of the temperature measuring process further displays, on the display device, at least one of the temperature distribution of a measuring target that includes the plurality of measuring points, the temperature at each of the plurality of measuring points, and a warning according to the corrected temperature data, on the display device.

* * * * *